United States Patent
Russalian

(10) Patent No.: US 10,094,454 B2
(45) Date of Patent: Oct. 9, 2018

(54) AXIAL THROUGH-SHAFT ACTUATOR ARRANGEMENT

(71) Applicant: Schaeffler Technologies GmbH & Co. KG, Herzogenaurach (DE)

(72) Inventor: Vigel Russalian, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1067 days.

(21) Appl. No.: 14/479,719

(22) Filed: Sep. 8, 2014

(65) Prior Publication Data
US 2015/0068334 A1    Mar. 12, 2015

Related U.S. Application Data

(60) Provisional application No. 61/875,805, filed on Sep. 10, 2013.

(51) Int. Cl.
| | |
|---|---|
| *F04D 15/00* | (2006.01) |
| *F16H 19/02* | (2006.01) |
| *F16H 25/00* | (2006.01) |

(52) U.S. Cl.
CPC ......... *F16H 19/02* (2013.01); *F04D 15/0038* (2013.01); *F16H 25/00* (2013.01); *F05D 2270/62* (2013.01); *Y10T 74/18296* (2015.01)

(58) Field of Classification Search
CPC .. F16H 19/02; F04D 15/0038; F04D 15/0055; F04D 27/002; F04D 29/2222; F04D 29/2242; F05D 2250/90
USPC .......................................... 415/131; 416/206
See application file for complete search history.

(56) References Cited

U.S. PATENT DOCUMENTS

| | | | | |
|---|---|---|---|---|
| 3,003,313 A | * | 10/1961 | Bunger | F02C 7/277 123/179.31 |
| 4,752,183 A | | 6/1988 | Sakurai | |
| 5,800,120 A | * | 9/1998 | Ramsay | F04D 15/0038 415/129 |
| 6,413,039 B1 | * | 7/2002 | Morris | F04D 29/167 415/111 |
| 6,669,439 B2 | * | 12/2003 | Kardasz | F04D 15/0038 415/131 |
| 6,935,839 B2 | | 8/2005 | Pascoe | |
| 7,475,764 B2 | * | 1/2009 | Schultheiss | F01P 5/12 192/103 R |
| 7,789,049 B2 | * | 9/2010 | Duley | F01P 5/12 123/41.44 |

* cited by examiner

*Primary Examiner* — Christopher Verdier
*Assistant Examiner* — Jason Mikus
(74) *Attorney, Agent, or Firm* — Volpe and Koenig, P.C.

(57) ABSTRACT

An axial, through-shaft actuator that is particularly useful for a variably actuatable water pump having a pump chamber, with an inlet and an outlet is provided. A hollow drive shaft extends into the pump chamber. A drive wheel is connected to the drive shaft. A variable flow impeller assembly having an impeller part connected to the drive shaft and a cover part, which is axially movable relative to the impeller part is located in the pump chamber and is movable from a first, pumping position to a second position to prevent pumping. A cup actuator assembly is axially movable on the hollow drive shaft, and includes an actuator plate and a pin extending through the hollow drive shaft that connects the axially movable impeller part and the actuator plate. An actuator displaces the actuator plate in the axial direction of the drive shaft to move the axially movable part.

17 Claims, 3 Drawing Sheets

AXIAL THROUGH-SHAFT ACTUATOR ARRANGEMENT

INCORPORATION BY REFERENCE

The following documents are incorporated herein by reference as if fully set forth: U.S. Provisional Application No. 61/875,805, filed Sep. 10, 2013.

FIELD OF INVENTION

The present invention relates to a mechanically acting, axial through-shaft actuator, and more particularly such an actuator that is suitable for use in variable actuation of a water pump for an internal combustion engine.

BACKGROUND

In automotive applications, there is a push for energy efficiency. Efficiencies can be gained for example, by having a water pump which is deactivated upon cold starting of an engine so that the engine can come up to the running temperature more quickly. Known systems for deactivating a water pump include a moveable cover which covers the vanes of the pump impeller when the water pump is not required. However, in such known systems, a hydraulic actuator has been typically used, requiring special seals for the actuator fluid, and or a separate pump for the actuator if the coolant being moved by the water pump is also used as the drive fluid for the actuator.

Additionally, as the water pump speed is directly correlated to the speed of the engine, the flow from a standard water pump is proportional to the engine speed. However, coolant requirements in an engine vary greatly based on many factors. With the known hydraulically actuated deactivatable water pumps, the controls do not allow for specific flow control levels so that the coolant flow can be optimized for efficient engine performance during the various operating conditions, and instead are designed for "off" or "on" operation.

It would be desirable to provide a less complex and more reliable actuator arrangement, and in particular a mechanically acting actuator that can be simply controlled and allow variable actuation, and in particular such an actuator for use in connection with a variable flow water pump in order to allow more precise flow control, while also maintaining a small space requirement, low weight, and low cost.

SUMMARY

Briefly stated, an axial, through-shaft actuator arrangement is provided comprising a hollow drive shaft that is adapted to extend through a housing from a drive side to a driven side. A bearing is located on the hollow drive shaft and is adapted to support the hollow drive shaft in the housing. A cup actuator assembly is axially movable on the hollow drive shaft. The cup actuator assembly includes an actuator plate and a pin extending through the hollow drive shaft having a first end that is connected to an axially movable part, and a second end that is connected to the actuator plate on the drive side. An actuator is connected to the actuator plate that variably displaces the actuator plate in the axial direction of the hollow drive shaft to move the axially movable part, via the pin, between first and second positions.

Preferably, the hollow drive shaft is rotatable, and the housing separates the drive side and the driven side. At least one seal is preferably provided between an inside of the hollow drive shaft and the pin.

The cup actuator assembly preferably includes axial ribs connected at a first end to the actuator plate, and the ribs are slidably located in corresponding axial keyways located on the hollow shaft, with a second end of the ribs extending beyond a drive side end of the hollow drive shaft where they are connected to a pin plate that is connected to the pin. This allows a drive wheel to be connected to the drive end of the hollow shaft that does not interfere with the cup actuator since it is located radially outside of the axial keyways and the slidable ribs.

The actuator plate is preferably circular, and includes a peripherally extending groove. The actuator includes a movable drive element that is connected to an actuator link, and the actuator link comprises at least one arm that engages in the peripherally extending groove. In a preferred arrangement, the actuator is a stepper motor, and the movable drive element is a threaded spindle. Here, the threaded spindle engages a nut located in the actuator link. Preferably, the actuator is connectable to the housing.

In another aspect, a variably actuatable water pump is provided having the axial, through-shaft actuator arrangement according to the invention. The water pump comprises a housing having a pump chamber, an inlet leading to the pump chamber, and an outlet from the pump chamber. A hollow drive shaft extends through the housing from a drive side of the water pump to the pump chamber. A drive wheel is connected to a drive side end of the hollow drive shaft. A variable flow impeller assembly is located in the pump chamber. The variable flow impeller assembly includes an axially fixed impeller part connected to the hollow drive shaft and an axially movable impeller part, which is movable relative to the axially fixed impeller part from a first position, in which blades connected to one of the impeller parts are exposed in order to pump coolant from the inlet to the outlet, to a second position, in which the blades are covered, in order to prevent pumping of the coolant. A cup actuator assembly is axially movable on the hollow drive shaft. The cup actuator assembly includes an actuator plate and a pin extending through the hollow drive shaft having a first end that is connected to the axially movable impeller part and a second end that is connected to the actuator plate on the drive side. An actuator is connected to the actuator plate that variably displaces the actuator plate in the axial direction of the hollow drive shaft to move the axially movable impeller part, via the pin, between the first and second positions.

Preferably, the cup actuator assembly includes axial ribs connected at a first end to the actuator plate, and the ribs are slidably located in corresponding axial keyways located on the hollow shaft, with a second end of the ribs extending beyond a drive side end of the hollow drive shaft where they are connected to a pin plate that is connected to the pin. The actuator plate is preferably circular, and includes a peripherally extending groove. The actuator includes a movable drive element that is connected to an actuator link, and the actuator link comprises at least one arm that engages in the peripherally extending groove. In a preferred arrangement, the actuator is a stepper motor, and the movable drive element is a threaded spindle. Here, the threaded spindle engages a nut located in the actuator link. This arrangement allows variable flow control by connection of the stepper motor to an electronic control system that monitors the temperature of the cooling system as well as the engine speed in order to vary a position of the axially movable impeller part so that a desired coolant flow is achieved. This can be used to chart an optimum engine cooling strategy that minimizes the energy required to pump fluid as well as allows operation of the engine at an optimal temperature to increase the overall efficiency of the system.

Preferably, the drive wheel is connected to the drive end of the hollow drive shaft in a position radially outwardly of the axial ribs, allowing the axial ribs to slide in the shaft keyways radially inwardly of an inside of the drive wheel where it connects to the hollow drive shaft.

Preferably, at least one seal is located between the pin and an interior of the hollow shaft in order to prevent flow of coolant along the actuator pin through the drive shaft.

Preferably, as a fail-safe, a return spring is located between the axially movable impeller part and the hollow drive shaft and the return spring biases the moveable impeller part to the first position so that in the event of an actuator failure, the impeller is in a fail-safe, coolant pumping position.

A shaft bearing assembly is located in the housing and supports the hollow drive shaft. In order to axially fix the hollow drive shaft in position, preferably a bearing groove is located on the hollow drive shaft, and the shaft bearing assembly includes bearing balls which ride in the bearing groove in the hollow drive shaft.

Preferably, in the variable flow impeller assembly, the blades are connected to the axially movable impeller part, and the axially fixed impeller part includes openings having a shape that corresponds to the blades. In the second position, the blades are located in the openings. In order to control flow between the first and second positions, varying portions of the blades are exposed by axially adjusting a position of the axially movable impeller part relative to the axially fixed impeller part resulting in a change in the pump flow.

Preferably, the actuator is mounted to a drive side of the pump housing, and, due to the use of the pin through the hollow drive shaft, the actuator arrangement for the preferred variably actuatable water pump has limited space requirements and can fit generally within the envelope of the known water pumps.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
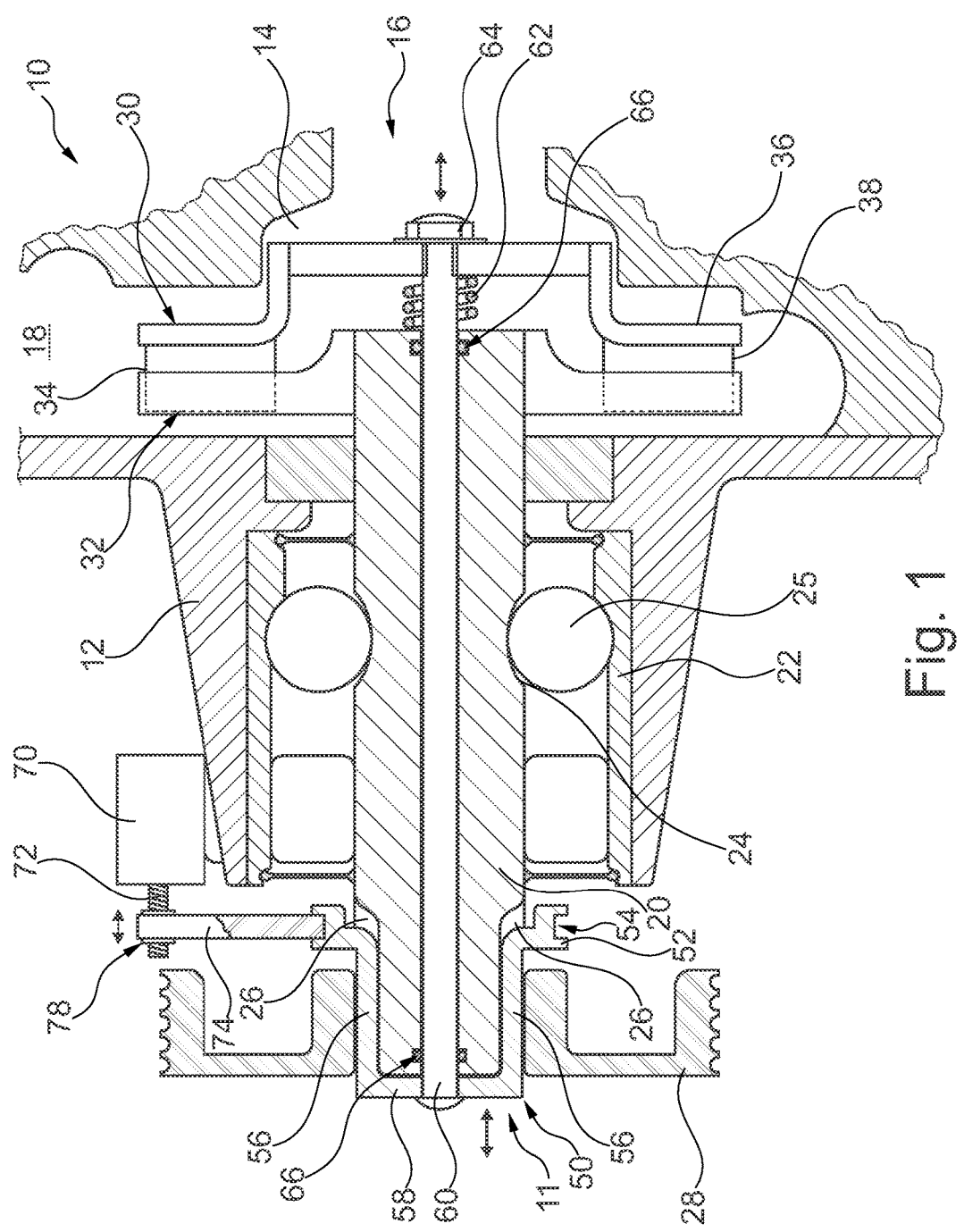
FIG. 1 is a cross-sectional view through a variably actuatable water pump according to a preferred embodiment of the invention.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIG. 1, a cross-sectional view of a variably actuatable water pump 10 is shown in detail which includes the preferred actuator arrangement 11 according to the invention. The variably actuatable water pump 10 is similar to existing water pumps used in automotive applications in connection with internal combustion engines in order to provide a coolant flow through the engine block as well as to other auxiliary systems, such as cabin heat exchangers, transmission fluid heat coolers, as well as possibly EGR and/or engine oil coolers. The water pump 10 includes a housing 12 having a pump chamber 14. An inlet 16 leads to the pump chamber 14 and an outlet 18 leads from the pump chamber 14. A hollow drive shaft 20 extends through the housing 12 from a drive side of the water pump 10 to the pump chamber 14. A drive wheel 28, shown in the form of a belt pulley, is connected to a drive side end of the hollow shaft 20. Those skilled in the art will recognize that other types of drive wheels, such as a chain wheel, could be utilized if desired.

Figure 4:
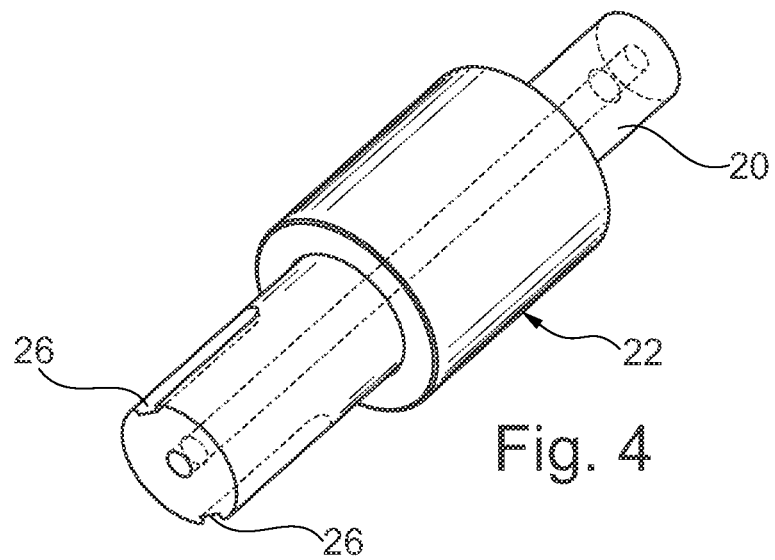
FIG. 4 is a perspective view showing the hollow drive shaft and shaft being assembly preassembled prior to installation in the water pump housing.

As shown in detail in FIGS. 1 and 4, preferably the hollow drive shaft 20 is mounted in the housing 12 via a shaft bearing assembly 22. Preferably, a circumferential groove 24 is located on the hollow drive shaft 20 and the shaft bearing assembly 22 preferably includes a roller bearing and a rolling bearing assembly with bearing balls 25 which ride in the shaft groove 24. This arrangement axially holds the hollow drive shaft 20 in position. The hollow drive shaft 20, the bearing assembly 22, including the bearing rolling elements and outer race can be provided as a single assembly, referred to as an integral shaft bearing (ISB). While one preferred arrangement of the shaft bearing assembly 22 is shown, those skilled in the art will recognize that other bearing arrangements could be utilized.

Still with reference to FIGS. 1 and 4, preferably shaft keyways 26 are located at the drive side end of the shaft 20. These are used in connection with the cup actuator assembly 50 described in detail further below.

Figure 6:
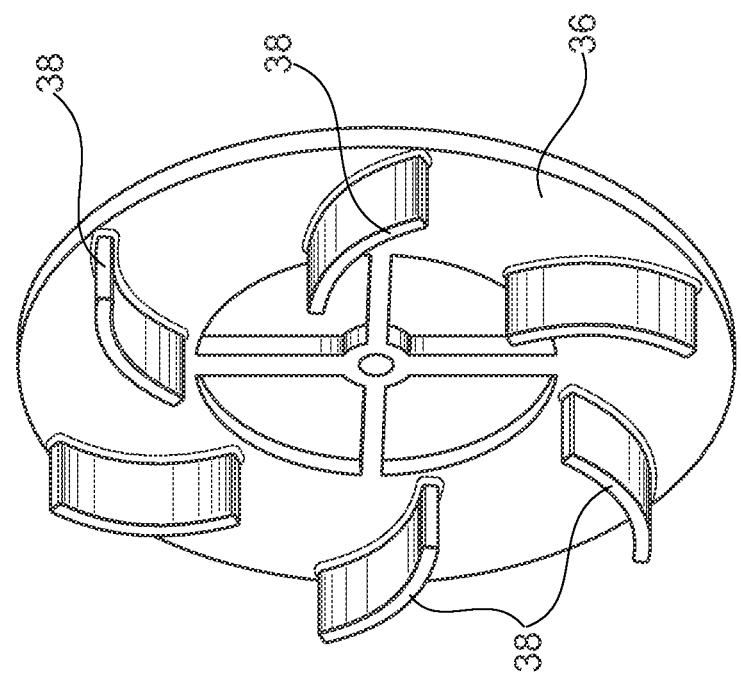
FIG. 6 is a perspective view showing the axially movable impeller part.
Figure 5:
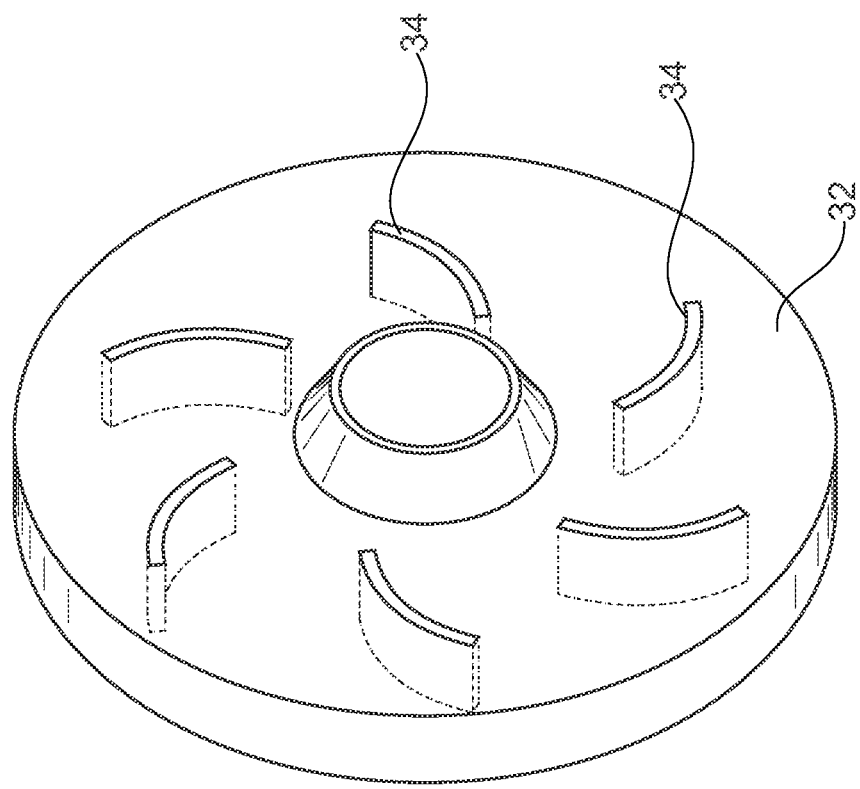
FIG. 5 is a perspective view showing the axially fixed impeller part.

Referring again to FIG. 1, a variable flow impeller assembly 30 is located in the pump chamber 14. The variable flow impeller assembly 30 includes an axially fixed impeller part 32, shown in detail in FIG. 5, which is connected to the hollow drive shaft 20, preferably via a press fit. An axially movable impeller part 36, shown in detail in FIG. 6, is located adjacent to the axially fixed impeller part 32 in the pump chamber 14. The axially movable impeller part 36 is movable relative to the axially fixed impeller part 32 from a first position, in which blades 38 connected to one of the impeller parts are exposed, in order to pump coolant from the inlet 16 to the outlet 18, to a second position in which the blades 38 are covered, in order to prevent pumping of coolant by the water pump 10. In the preferred arrangement, the blades 38 are connected to the axially movable impeller part 36, and the axially fixed impeller part 32 includes openings 34 having a shape that corresponds to the blades 38. In the second position, the blades 38 are located in the opening 32. Depending upon how much of the blades 38 are exposed, the pump flow volume from the water pump 10 can be increased or decreased since the volume of fluid flow is proportional to the area of the blades 38 for a given rotational speed of the variable flow impeller assembly 30. Those skilled in the art will recognize that the blades could be located on the axially fixed impeller part 32, and the axially movable impeller part 36 could include the openings.

Figure 2:
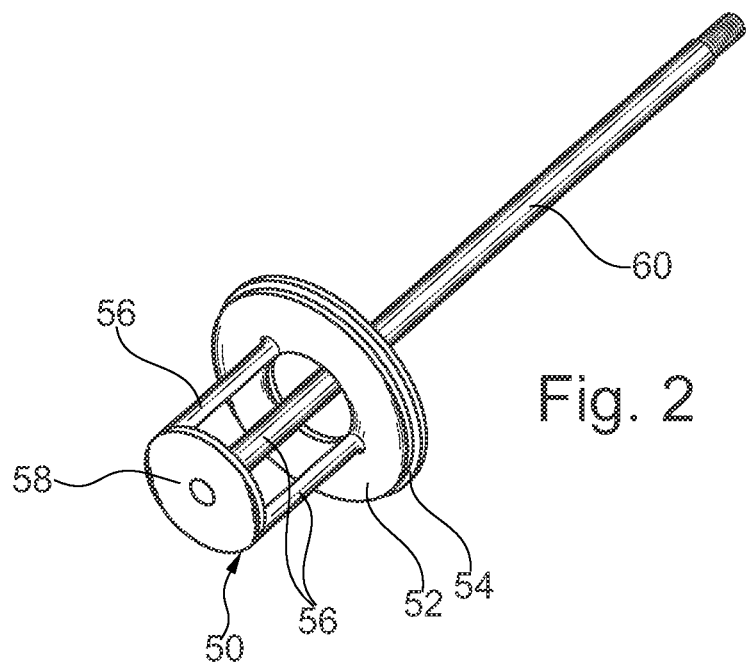
FIG. 2 is a perspective view of the cup actuator assembly and actuator pin.

Referring to FIGS. 1 and 2, in order to control a position of the axially movable impeller part 36, the cup actuator assembly 50 is provided which is axially movable on the hollow drive shaft 20. The cup actuator assembly 50 includes an actuator plate 52 which is preferably circular and includes a peripherally extending groove 54, preferably located on a radially outer edge thereof. A pin 60 extends through the hollow drive shaft 20 and includes a first end that is connected to the axially movable impeller part 36 and a second end that is connected to the actuator plate 52 on the drive side. As shown in FIGS. 1 and 2, this connection is preferably accomplished through the cup actuator assembly 50 including axial ribs 56 connected at a first end to the actuator plate 52, with the ribs 56 being slidably located in corresponding ones of the axial shaft keyways 26 located on the hollow drive shaft 20, and a second end of the axial ribs 56 extending beyond the drive side end of the hollow drive shaft 20 where they are connected to a pin plate 58 to which a drive side end of the actuating pin 60 is also connected. Preferably, the actuator plate 52, axial ribs 56, and the pin plate 58 are formed in one piece from sheet metal. However, they can also be molded or formed of other materials. Preferably, there are at least two of the axial ribs 56. In this arrangement, the drive wheel 28 is located in a position radially outwardly of the axial ribs 56 on the hollow drive shaft 20, with the axial ribs 56 being recessed into the surface of the hollow drive shaft 20 so that press fitting of the drive wheel 28 onto the hollow drive shaft 20 does not affect the free axial movement of the cup actuator assembly 50 with the attached actuating pin 60 along the axis of the hollow drive shaft 20 within the design limits.

Referring again to FIG. 1, an actuator 70, preferably in the form of a stepper motor, is connected to the actuator plate 52 and variably displaces the actuator plate 52 in the axial direction of the hollow drive shaft 20 to move the axially movable impeller part 36, via the actuating pin 60, between the first and second positions. The actuator 70 includes a movable drive element 72, here preferably in the form of a threaded spindle, that is connected to an actuator link 74, shown in detail in FIG. 3, which includes at least one arm 76A, 76B, that engages in the peripherally extending groove 54 in the actuator plate 52. The movable drive element 72 in the form of the threaded spindle engages a nut 78 located in the actuator link 74 so that as the threaded spindle 72 is turned via the actuator 70, a position of the actuator link 74 can be varied axially. The at least one arm 76A, 76B engaged in the groove 54 transfers this axial movement to the cup actuator assembly 50 in order to move the actuating pin 60 and cause a corresponding movement of the axially moveable impeller part 36.

Referring again to FIG. 1, preferably at least one seal 66 is located between the actuating pin 60 and an interior surface of the hollow drive shaft 20. This prevents the leakage of coolant through the hollow interior of the hollow drive shaft 20. As shown, preferably an O-ring seal 66 is provided at each end of the hollow drive shaft 20.

Additionally, a return spring 62 is preferably located between the axially movable impeller part 36 and the hollow drive shaft 20 that biases the movable impeller part 36 to the first position. This is provided as a fail-safe in the event of loss of power to the actuator 70 so that the variable flow impeller assembly 30 fails in the first position allowing continued flow of coolant through the cooling system of the internal combustion engine.

As shown in FIG. 1, the actuator 70 is preferably mounted to a drive side of the water pump housing 12. The use of a stepper motor as the actuator 70 is preferred due to the precise control provided through the screw-type drive between the stepper motor and the actuating link 74.

In use, when the actuator 70 (preferably the stepper motor) turns, the actuator link 74 is axially moved due to the connection between the drive element 72 (threaded spindle) and the nut 78. This in turn moves the cup type actuator assembly 50 with the attached actuating pin 60 in order to provide a corresponding movement of the axially movable impeller part 36 to adjust the volume of fluid flow through the water pump 10 based on the area of the impeller blades 38 that are exposed. Flow can be increased or decreased based on the position of the actuator link 74 in order to provide the desired volume of coolant required for cooling or maintaining the engine block temperature in a desired range. Preferably, an electronic control system is provided in order to adjust the variable flow impeller assembly 30 depending upon the coolant temperature which can be determined by a temperature sensor, as well as the engine speed. This allows an optimum engine cooling strategy to be developed and implemented via the electronic control system, which can be integrated into an ECM in order to increase the overall efficiency of the internal combustion engine.

Figure 3:
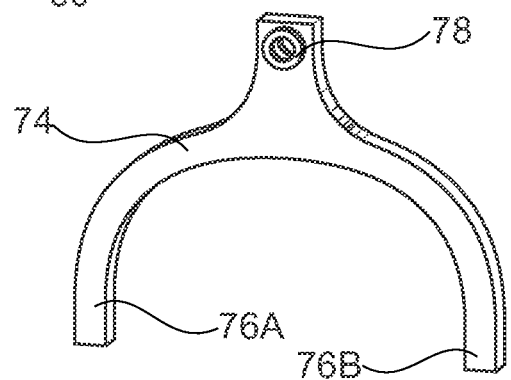
FIG. 3 is a perspective view of the actuator link.

The axial through-shaft actuator arrangement 11 can be used in various outer applications in connection with a hollow drive shaft 20 adapted to be supported by a shaft bearing assembly 22 in a housing, as shown ion FIG. 3. Here the cup actuator assembly 50, shown in FIG. 2 is axially movable on the hollow drive shaft 20 in the manner described above, and includes the actuator plate 52 and the pin 60 extending through the hollow drive shaft 20 having a first end that is connected to an axially movable part 36, and a second end that is connected to the actuator plate 52 on the drive side. The actuator 70 is connected to the actuator plate 52 in order to variably displace the actuator plate 52 in the axial direction of the hollow drive shaft 20 to move the axially movable part 36, via the pin 60, between first and second positions.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An axial through-shaft actuator arrangement, comprising:

a hollow drive shaft adapted to extend through a housing from a drive side to a driven side;

a bearing located on the hollow drive shaft adapted to support the hollow drive shaft in the housing;

a cup actuator assembly axially movable on the hollow drive shaft, the cup actuator assembly includes an actuator plate and a pin extending through the hollow drive shaft having a first end that is connected to an axially movable part, and a second end that is connected to the actuator plate on the drive side; and an actuator connected to the actuator plate that variably displaces the actuator plate in an axial direction of the hollow drive shaft to move the axially movable part, via the pin, between first and second positions.

2. The axial through-shaft actuator arrangement of claim 1, wherein the hollow drive shaft is rotatable, the housing is adapted to separate the drive side and the driven side, and at least one seal is provided between an inside of the hollow drive shaft and the pin.

3. The axial through-shaft actuator arrangement of claim 1, wherein the cup actuator assembly includes axial ribs connected at a first end to the actuator plate, and the ribs are slidably located in corresponding axial keyways located on the hollow shaft, and a second end of the ribs extends beyond a drive side end of the hollow drive shaft and are connected to a pin plate that is connected to the pin.

4. The axial through-shaft actuator arrangement of claim 3, wherein the actuator plate is circular, and includes a peripherally extending groove.

5. The axial through-shaft actuator arrangement of claim 4, wherein the actuator includes a movable drive element that is connected to an actuator link, and the actuator link comprises at least one arm that engages in the peripherally extending groove.

6. A variably actuatable water pump, comprising:
a housing having a pump chamber, an inlet leading to the pump chamber and an outlet from the pump chamber;
a hollow drive shaft extending through the housing from a drive side of the water pump to the pump chamber, with a drive wheel connected to a drive side end of the hollow drive shaft;
a variable flow impeller assembly located in the pump chamber, including an axially fixed impeller part connected to the hollow drive shaft and an axially movable impeller part, movable relative to the axially fixed impeller part from a first position in which blades connected to one of the impeller parts are exposed, in order to pump coolant from the inlet to the outlet, to a second position in which the blades are covered, in order to prevent pumping of the coolant;
a cup actuator assembly axially movable on the hollow drive shaft, including an actuator plate, an actuating pin extending through the hollow drive shaft having a first end that is connected to the axially movable impeller part and a second end that is connected to the actuator plate on the drive side, and an actuator connected to the actuator plate that variably displaces the actuator plate in an axial direction of the hollow drive shaft to move the axially movable impeller part, via the actuating pin, between the first and second positions.

7. The variably actuatable water pump of claim 6, wherein the cup actuator assembly further comprises axial ribs connected at a first end to the actuator plate, and the ribs are slidably located in corresponding axial keyways located on the hollow drive shaft, with a second end of the axial ribs extending beyond the drive side end of the hollow drive shaft, and a pin plate is connected to the second end of the ribs and to the pin.

8. The variably actuatable water pump of claim 7, wherein the actuator plate is circular and a peripherally extending groove is located on the actuator plate.

9. The variably actuatable water pump of claim 8, wherein the actuator includes a movable drive element that is connected to an actuator link, and the actuator link comprises at least one arm that engages in the peripherally extending groove.

10. The variably actuatable water pump of claim 9, wherein the actuator is a stepper motor and the movable drive element is a threaded spindle, and the threaded spindle engages a nut located in the actuator link.

11. The variably actuatable water pump of claim 7, wherein the drive wheel is connected to the drive end of the hollow drive shaft in a position radially outwardly of the axial ribs.

12. The variably actuatable water pump of claim 6, further comprising at least one seal located between the pin and an interior surface of the hollow drive shaft.

13. The variably actuatable water pump of claim 6, further comprising a return spring located between the axially movable impeller part and the hollow drive shaft that biases the movable impeller part to the first position.

14. The variably actuatable water pump of claim 6, further comprising a shaft bearing assembly that is located in the housing and the hollow drive shaft is supported in the shaft bearing assembly.

15. The variably actuatable water pump of claim 14, wherein the hollow drive shaft includes a bearing groove and the shaft bearing assembly includes bearing balls which ride in the bearing groove.

16. The variably actuatable water pump of claim 6, wherein the blades are connected to the axially movable impeller part and the axially fixed impeller part includes openings having a shape that corresponds to the blades, and in the second position, the blades are located in the openings.

17. The variably actuatable water pump of claim 6, wherein the actuator is mounted to a drive side of the housing.

* * * * *